_United States Patent Office_

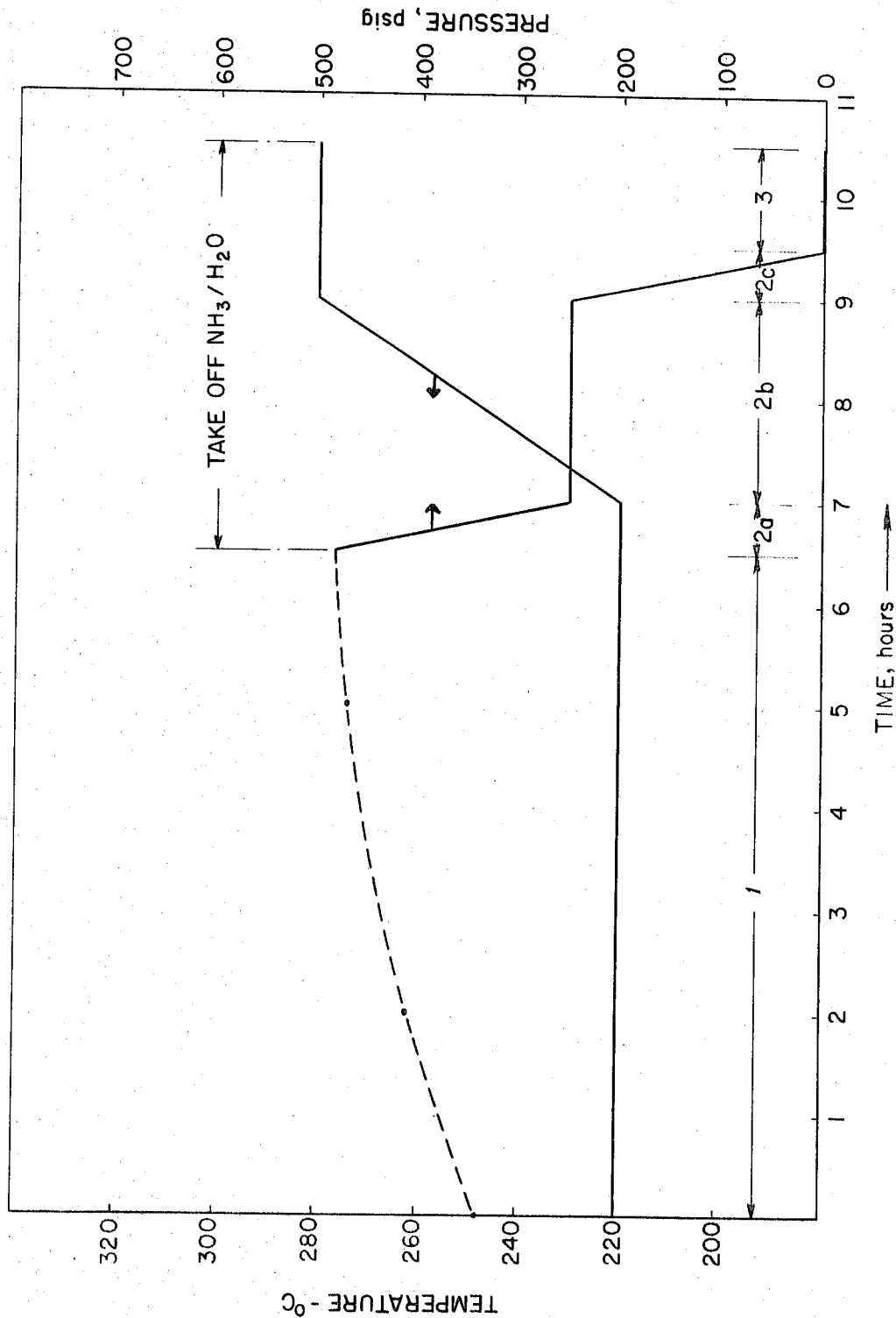

3,847,876
Patented Nov. 12, 1974

3,847,876
PREPARATION OF POLYAMIDES BY POLYMERIZATION OF A DINITRILE, A DIAMINE AND WATER IN THE PRESENCE OF CONTROLLED AMOUNTS OF AMMONIA
Olav T. Onsager, Waldwick, N.J., assignor to Halcon International Inc., New York, N.Y.
Filed July 6, 1972, Ser. No. 269,339
Int. Cl. C08g 20/20
U.S. Cl. 260—78 R          32 Claims

ABSTRACT OF THE DISCLOSURE

High molecular weight polyamides are prepared by polymerization of a dinitrile, a diamine and water in the presence of controlled amounts of ammonia, and preferably also in accordance with a predetermined temperature-pressure program.

---

This invention relates to the preparation of high molecular weight polyamides, i.e. nylons, by polymerizing polyamide precursors which are obtained by reacting dinitriles with diamines in the presence of water.

Commercial processes for preparing nylons, which use diamines and dicarboxylic acids as raw materials, are well-known in the art. The commercial reaction may be represented by the following equation.

$n(H_2NRNH_2) + n(HO_2CR'CO_2H) \longrightarrow$

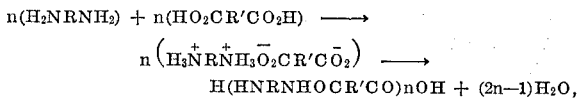

$H(HNRNHOCR'CO)_nOH + (2n-1)H_2O$, wherein R and R' are generally hydrocarbon groups and wherein $n$ represents the degree of polymerization. In order to insure proper balance of the reactive amine and acid groups, the first step in the preparation of a high molecular weight polyamide (nylon) is, as shown by the equation above, the formation and purification of the diamine salt of the dibasic acid,

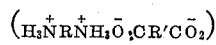

When preparing nylon-6,6, the hexamethylenediamine salt of adipic acid, hexamethylenediammonium adipate, is usually prepared by mixing stoichiometric proportions of the components in water to form a solution. The nylon salt is converted to the polymer by heating it to a temperature at which the condensation of the amine and acid groups occurs, releasing water and forming the —CONH— linkages.

At an early date in the development of nylons it was proposed that linear polyamides be made by heating a reaction mixture comprising a dinitrile, a diamine, and water, as disclosed in Greenwalt U.S. Pat. No. 2,245,129. The procedure disclosed in the Greenwalt patent is carried out in two stages, the first stage comprising the heating of the reaction mixture in a closed reaction vessel until a low molecular weight polyamide is formed, and the second stage comprising subsequent heating of the precursor or prepolymer thus produced to form a higher molecular weight polyamide. The patent discloses the preparation by this means of polyamides having intrinsic viscosities ranging between 0.3 and 1.15. The polyamides thus produced, however, were, by commercial standards, of relatively poor quality and of only intermediate molecular weight and, despite the early disclosure of this process, the commercial development of processes for the preparation of nylons, such as nylon-6,6, has followed the diamine-dicarboxylic acid route described above.

It is an object of the present invention to provide an improved process for preparing high molecular weight polyamides, i.e. nylons, directly from diamines and dinitriles.

It is a further object of the invention to provide a process of the character indicated which is effective to produce high molecular weight nylons having quality and utility characteristics corresponding to those of commercial nylons made from diamine-dicarboxylic acid salts.

It is a further object of this invention to provide an integrated, efficient process which proceeds directly from diamines and dinitriles and yields high molecular weight fiber-grade nylons.

It is still a further object of the invention to provide a process for producing nylon-6,6 from hexamethylenediamine and adiponitrile.

In accordance with the invention, substantially equimolar quantities of a diamine, e.g. hexamethylenediamine, and a dinitrile, e.g. adiponitrile, are heated in a controlled manner in the presence of water, the amount of water being 20 to 95% by weight, preferably 20 to 50% by weight, based on the total of diamine, dinitrile and water. Pursuant to one aspect of the invention, such heating is carried out under a selected temperature and pressure regimen in three stages for predetermined periods of time, and in accordance with another aspect of the invention, the heating is effected in the presence of controlled quantities of ammonia. In the first stage of the three stages mentioned, the liquid reaction mixture comprising diamine, dinitrile and water is heated until a conversion of at least 80%, preferably at least 90%, of the dinitrile has been realized. As used herein, the term "conversion" means the percentage of nitrile groups converted to amide groups. With reference to the ammonia control aspect of the process, the average amount of ammonia in the liquid phase, i.e. the free ammonia present in the liquid reaction mixture, during the first stage is at least 1% by weight of said liquid reaction mixture, preferably at least 3.5% by weight. The temperature-pressure aspect of the invention in the first stage is provided by carrying out this stage in a substantially closed system under autogenous or higher pressure at a temperature of 200° to 260° C. The maximum pressure employed in the first stage is generally determined by the apparatus which is used for carrying out this segment of the process, but as a general rule a practical maximum is 2000 p.s.i.g.

The percentage conversion is readily determined in routine manner by, for example, infra-red analysis of residual nitrile groups, with the value determined being compared with a pre-established standard. The percentage of ammonia in the liquid phase is a function of pressure, the size of the reaction vessel, and the amount of liquid present, and the quantity and state of the ammonia in the reaction zone can be easily monitored by the taking of vapor and liquid samples from time to time, as will be obvious to persons skilled in the art.

In the second stage of the process, the heating is continued to effect further conversion of dinitrile to at least about 95%, preferably at least about 99%. In accordance with the temperature-pressure pattern of the invention, the temperature is gradually increased to 260° to 300° C., while the pressure is gradually reduced substantially to atmospheric, and ammonia control is achieved by having the average amount of ammonia in the liquid phase, i.e. the free ammonia present in the liquid reaction mixture, at least 0.1% by weight of said liquid reaction mixture, preferably at least 0.5% by weight. In the second stage, the reaction zone is gradually vented to remove both ammonia and water.

In the third stage, heating is effected at substantially constant temperature and at the pressure reached at the end of the second stage or lower. This temperature will be within the range of 260° to 300° C. and the pressure will be substantially atmospheric or lower.

In the third stage the reaction mixture is stripped of residual ammonia and of residual water and this is continued until a linear polyamide of the desired molar weight, as measured by intrinsic viscosity, is obtained.

It is believed that the conversion of nitriles in accordance with this invention proceeds, on a mono-functional basis, in accordance with the following three equations:

1. 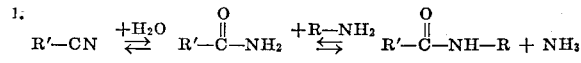

2. 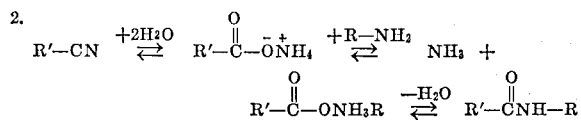

3. 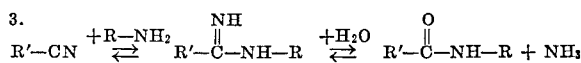

The amount of water needs to be at least that stoichiometrically required for the reaction and, generally speaking, it is desirable to have at least a 10% molar excess of water, but the amount of water should be at most 95% of the total charge, preferably at most 50%. In order to provide the requisite quantities of ammonia in the first and second stages. ammonia may be added to the system, which is an aqueous mixture e.g. as liquid ammonia, and it has been found that the amount of ammonia present should be greater the greater the amount of water. Thus, while it has been indicated above that the average amount of ammonia in the liquid phase during the first stage should be at least 1% by weight, when the amount of water exceeds 50%, i.e. the amount of water lies in the upper portion of the previously-mentioned range of 20 to 95%, the average amount of ammonia present in the first stage should be at least about 3.5% by weight. The maximum amount of ammonia is influenced by the equilibria of the amide-forming reactions and should not exceed that permitting achievement of the indicated extent of conversion.

It is surprising that significantly improved results in terms of the ultimate fiber produced from the polymer product of the process of this invention are obtained by taking care to retain at least a minimum amount of ammonia in the system, since it would be expected that it would be preferable to remove all of the ammonia, thereby driving the equilibria of the amide-forming reactions in favor of the product amide.

However, in order to produce fiber-grade nylons wherein high molecular weight, freedom from gel and cross-linked segments are important considerations, and operation under specific, controlled conditions, such as those which characterize the process of the present invention, provides these results.

In a preferred form of the temperature-pressure regiment of the invention, the second stage is subdivided into three substages, 2a, 2b, and 2c, each of which is carried out under specific temperature and pressure conditions. Thus, in the 2a stage, the heating is continued at a temperature of 200° to 260° C. while the system is gradually vented to reduce the pressure from the final pressure of step 1 to a pressure in the range between 100 and 700 p.s.i.g. In the 2b stage the temperature is gradually increased by at least 10° C. from the second stage temperature to 260° to 300° C., while the pressure is maintained constant, and in the 2c stage, heating is continued at 260° to 300° C. but the pressure is gradually decreased to about atmospheric pressure. The time period during which each stage is carried out can vary widely and is, in general, determined by the molecular weight desired in the product polymers, longer times favoring higher molecular weights, but is within the range of 10 to 420 minutes in the second stage, and 10 to 240 minutes in the third stage. The free nitrile group conversion after stage 2b should at least be 95%. In preferred operation, the second stage time is subdivided into 10 to 120 minutes in the 2a stage, 10 to 180 minutes in the 2b stage, and 10 to 120 minutes in the 2c stage. The following Table I sets forth the above-indicated temperature, pressure and time characteristics for the preferred procedure involving the subdivision of the second stage:

TABLE I

| Stage | Temp., °C. | Preferred temp., °C. | Pressure, p.s.i.g. | Time, min. | Preferred time, min. |
|---|---|---|---|---|---|
| 1 | 200-260 | 220-250 | Autogenous or higher. | (1) | (2) |
| 2a | 200-260 | 220-250 | Reduced to stage 2b pressure. | 10-120 | 20-60 |
| 2b | Increase to 260-300. | Increase to 270-290. | 100-700 [3] | 10-180 | 60-120 |
| 2c | 260-300 | 270-290 | Reduced to 1 atm. | 10-120 | 20-60 |
| 3 | 260-300 | 270-290 | 1 atm. or below. | 10-240 | 60-180 |

[1] Sufficient to effect at least 80% dinitrile conversion.
[2] Sufficient to effect at least 90% dinitrile conversion. (At 220° C., the preferred time of reaction is between 6 and 8 hours.)
[3] Preferably 200-550.

Characteristic of all operations in accordance with the invention is that the major portion of the ammonia and water which is removed in the course of the process is removed at a pressure greater than 100 p.s.i.g. and in no case before an 80% nitrile conversion is obtained. The ammonia and water are continuously or intermittently removed during the second and third stages.

It will be seen from the foregoing that the process of the invention in its preferred aspect follows a specific temperature-pressure profile within the limits specified and it has been found that by the sequential treatment of the diamine, dinitrile, water reaction mixture in accordance with the criteria specified above, high quality, high molecular weight fiber-grade polyamides are readily produced directly from the diamine and the dinitrile. A typical but purely illustrative, temperature-pressure profile in accordance with the invention is shown in the accompanying drawing.

The dinitriles which may be used in accordance with the invention in the reaction with a diamine and water are dinitriles containing from 2 through 18 carbon atoms. The dinitriles may be aliphatic, straight chain or branched, or aromatic or they may contain a hetero-atom. Also useful are substituted dinitriles so long as the substituents are inert under the reaction conditions. Preferably, however, the dinitriles are the aliphatic or aromatic dinitriles which contain from 4 through 12 carbon atoms, such as, succinonitrile, adiponitrile, suberonitrile, sebaconitrile, 1,12 dodecanedinitrile, terephthalonitrile, methyl glutaronitrile, and the like; i.e. dinitriles of the formula NC—R—CN wherein R is an alkylene or arylene group of 2 to 10 carbon atoms.

The diamines suitable for use in the reaction are the diamines containing from 2 through 18 carbon atoms. The diamines may be aliphatic, straight chain or branched, or aromatic or they may contain a hetero-atom. Also useful are substituted diamines, provided the substituents are inert under the reaction conditions. Preferably, the diamines are the aliphatic or aromatic diamines which contain from 4 through 12 carbon atoms, such as, tetramethylenediamine, hexamethylenediamine, 1,12-dodecanediamine, p-xylenediamine, and the like, i.e. diamines of the formula $H_2N$—R'—$NH_2$ wherein R' is an alkylene or arylene group containing 4–12 carbon atoms. In the most preferred aspect of the invention, the nitrile is adiponitrile and the amine is hexamethylenediamine and the polyamide produced is nylon-6,6. In order to obtain a polymer product with controlled molecular weight and high thermal stability a small amount, from 5 to 0.1 mol percent, of a monofunctional organic acid, e.g. an alkanoic acid or an aryl carboxylic acid, e.g. containing 1 to 12 carbon atoms in the hydrocarbon radical attached to the carboxyl group, preferably 1 to 6 carbon atoms, such as, acetic acid, propionic acid, benzoic acid and the like, or of a monofunctional organic base, e.g. a primary or secondary alkyl, cycloalkyl or aryl amine, e.g. containing up to 18 carbon atoms in each hydrocarbon radical attached to the amino group, such as monoethylamine, diethylamine, dihexylamine, diphenylamine, aniline, dicyclohexylamine, and the like, is added to the reaction mixture. The use of a secondary amine of the formula $NHR_1R_2$, wherein $R_1$ and $R_2$ may be the same or different and are alkyl, cycloalkyl or aryl groups containing 2 to 18 carbon atoms, has been found to be most desirable for this function. Addition of the organic acid is preferably effected during the last stage of operation. The amine may be added during any of the stages.

As previously mentioned the two aspects of the present invention are (1) the average amount of ammonia in the reaction zone above the minima specified in combination with the extent of nitrile conversion, and (2) the specified pressure-temperature program. Each of these aspects is of significance, and when combined they lead to the maximum benefits obtainable in accordance with the invention.

From a commercial standpoint, the possibility of producing high quality fiber-grade nylons from diamines and dinitriles is of significance because dinitriles can be readily prepared from mononitriles, e.g. by reductive dimerization procedures, such as described in Holland et al. U.S. Pat. No. 3,496,216, and the diamine can be easily produced from the dinitrile in conventional manner by well-known reduction, e.g. hydrogenation procedures. For example, adiponitrile can be directly produced from acrylonitrile by reductive dimerization and hexamethylenediamine can be directly produced by hydrogenating adiponitrile. Although, as indicated above, the process of the invention is applicable to a wide variety of diamines and dinitriles, it is of special value in the production of nylon-6,6 and the following description of the invention and of illustrative embodiment of it will be primarily directed to the conversion of adiponitrile and hexamethylenediamine into nylon-6,6.

In the first stage of the process of this invention, the dinitrile and the diamine react to a predetermined extent in the presence of a limited amount of water to produce a product which can be characterized as a nylon "precursor". The nylon precursor thus obtained is a mixture comprising predominantly amide oligomers (polyamides of low molecular weight). The lowest molecular weight oligomer is a dimer formed by the reaction of one molecule of the nitrile and one molecule of the diamine in the aqueous medium and is characterized by the presence of a single substituted amide group (—CONH—). Trimers, tetramers, etc. contain 2, 3 and more substituted amide groups. The end groups may be unsubstituted amide groups, amino groups, cyano groups, or salt groups. Varying amounts of free amine and/or nitrile may also be present, although it is preferred that the reaction be carried as far toward completion as feasible, e.g. at least 80%, as previously indicated.

It will be apparent from the foregoing that the exact total composition of the precursor is not fully known but, for convenience, it can be generally characterized as having its total nitrogen content, excluding the ammonia, unreacted amine and nitrile, divided into 60 to 90% N-substituted amide groups, 2 to 20% salt groups, and 5 to 20% unsubstituted amide groups. It will be understood that the foregoing exemplary breakdown of the product components is not to be interpreted or construed as limitative but only as being indicative of the nature of the product. The principal characterizing feature of the product obtained by the reaction of a diamine with a dinitrile in an aqueous medium in the first stage of the process of this invention is that it is produced in the manner indicated in an aqueous medium of the specified concentration and that it will produce high molecular weight fiber-grade polyamides when further treated in stages 2 (2a, 2b, and 2c) and 3.

In the first stage of the process, the mol ratio of dinitrile to diamine may vary from 0.9:1 to 1.1:1, preferably from 0.95:1 to 1.05:1, but more desirably from 0.99:1 to 1.01:1. All of the diamine and dinitrile may be initially present in admixture with the water, or the diamine and water may be incrementally added to the reaction mixture as the first stage reaction proceeds. In this case, at least 5 mol percent of the stoichiometric quantity of diamine is initially present, the rest being added during the course of reaction.

The entire process may be carried out batch-wise, and for this purpose the first stage reaction can be carried out in any convenient pressure vessel adapted to withstand the pressures encountered. The first stage reaction involves the evolution of ammonia and the autogenous pressure gradually, therefore, increases as the reaction proceeds. Preferably the initial pressure is selected so that the final pressure will not be greater than about 2000 p.s.i.g. and the reaction may thus be initiated at atmospheric, sub-atmospheric, or superatmospheric pressure. However, it is within the scope of the invention to carry out the first stage reaction at constant pressure by applying an inert gas pressure to the system and adjusting this pressure as the reaction proceeds to maintain the pressure at a substantially constant value. In this case, pressures of 500 to 1500 p.s.i.g. are preferred. In the subsequent stages of the process, reaction vessels are employed which are equipped with means for withdrawing water and ammonia. It will be understood, therefore, that any conventional equipment may be employed and the type of equipment used is in no way critical, although preferably glass-lined reaction vessels are used.

It is a feature of this invention, however, that the process readily lends itself to continuous operation in a system involving recycling to the inlet of the reactor a portion of the effluent from the reactant during the first stage of the process since such continuous operation with recycling facilitates the maintenance of free ammonia in the system above the specified average minima. For this purpose there is suitably used a back-mixing reactor system which may, for example, be a glass-lined tubular reactor provided with means for recycling 10 to 90% of the effluent.

The first stage reaction product is then subjected to the subsequent reaction stages, advantageously under the pressure, temperature and time conditions set forth above. The particular conditions selected for each stage for a particular first stage product are governed primarily by the molecular weight of final polymer product. Higher temperatures, pressures and longer times tend to favor higher molecular weight. In any case, a temperature/pressure profile of the type described above, a preferred form of which is exemplified in the drawing is preferably followed. In the particular procedure shown in the drawing, the first stage reaction is carried out for 6.5 hours at a temperature of about 220° C. from an initial pressure of about 340 p.s.i.g. to a final pressure of about 480 p.s.i.g., the 2a stage involves a reaction period of 0.5 hour, also at a temperature of about 220° C. with a gradual reduction of pressure to about 250 p.s.i.g., the 2b stage reaction is carried out for 2 hours at about 250 p.s.i.g. with a gradually-increasing temperature from 220° C. to 280° C., followed by the 2c stage having a reaction time of 0.5 hour during which the temperature is maintained at about 280° C. but the pressure is gradually reduced to atmospheric, and the process is completed by the third stage reaction at atmospheric pressure at about 280° C., ammonia and water being continuously removed during each stage beginning with the second stage of reaction.

However, illustrative of the basic three-stage generic system of the invention is a process wherein the first stage and the last stage are carried out as shown in the system illustrated in the drawing, but the second stage, instead of involving the steps 2a, 2b and 2c, comprises a single step in which, during the course of 2.5 hours, the pressure is gradually reduced from 480 p.s.i.g. to 0 p.s.i.g. and the temperature is gradually raised from 220° C. to 280° C. In another illustrative system, the first stage (6.5 hours) is carried out at a constant pressure of 700 p.s.i.g. by means of a controlled application of a nitrogen pressure to the reactor and in the second stage (3.5 hours) this pressure is gradually reduced to 0 p.s.i.g. During this procedure, the temperature is maintained at 230° C. for the first six hours of the first stage and then gradually raised to 240° C. and during the second stage it is gradually raised to 275° C. in 1.5 hours and then maintained at 275° C. for the remainder of the second stage. The third stage (1 hour) is effected at a constant pressure of 0 p.s.i.g. and at a constant temperature of 275° C. In a still further illustrative embodiment, the first stage (5 hours) is carried out at a constant pressure of 800 p.s.i.g. and at a temperature which is gradually raised from 210° C. to 240° C. During the second stage (3.5 hours) the pressure is gradually reduced to 0 p.s.i.g. and the temperature is further gradually raised to 285° C. over a period of three hours and then maintained at this level. In the last stage (1.5 hours) the pressure is reduced to 20 mm. Hg and the temperature is constant at 285° C.

The following examples will serve to provide a fuller understanding of the invention, but it is to be understood that they are given for illustrative purposes only, and are not to be construed as limitative of the invention.

EXAMPLE I

To an electrically-heated 1 liter glass-lined autoclave, equipped with a stirrer, a temperature controller and a pressure regulator, were charged 108.14 parts of adiponitrile, 116.22 parts of hexamethylenediamine, and 183.0 parts of water. The autoclave was flushed with argon and pressured with argon to 200 p.s.i.g. The autoclave was then heated with continuous stirring, for a period of 6.5 hrs. at 220° C., during which time the pressure was maintained constant at 600 p.s.i.g. (1 stage). At the end of stage one an aliquot sample was withdrawn from the reaction mixture "the polyamide precursor" and the autoclave connected to a water cooled condenser system for collection of aqueous ammonia. In the 2$a$ stage the system pressure was gradually reduced from 600 p.s.i.g. to 250 p.s.i.g. over a period of 0.5 hrs. maintaining a constant reaction temperature of 220° C. During the following 2$b$ stage, the temperature was increased from 220° C. to 280° C. over a period of 2 hr. in accordance with a linear temperature program, during which time the pressure was constant at 250 p.s.i.g. In the 2$c$ stage of reaction, the pressure was gradually reduced from 250 p.s.i.g. to atmospheric over a period of 0.5 hr. The temperature was constant at 280° C. At the end of stage 2$c$, 0.5 mol percent diphenylamine (based on adiponitrile) was added to the reaction mixture. The reaction was completed in the last stage at atmospheric pressure and 280° C. for 1.5 hr. The highly viscous reaction product was then cooled to room temperature. During all stages, except stage 1, ammonia and water were continuously removed from the reaction mixture and collected in the condenser system.

The polymer product so made was found to be a water-white substance having an intrinsic viscosity in m-cresol at 29° C. of 1.6. When this polymer was formed into fibers, the fibers were found to be practically free from gel and characterized by physical properties which for all practical purposes were found to be identical with those obtained for commercial nylon-6,6 made from adipic acid and hexamethylenediamine.

One part of the polyamide precursor sample collected after reaction stage 1 was analyzed for ammonia and found to contain 7.7% $NH_3$. Another part was dried in vacuum (<1 mm. Hg) for 3 hours at room temperature. The so obtained white powder residue was analyzed by infra-red and found to contain less than 10% of free nitrile groups based on the charge. The concentration of nylon salt and free amino groups was analyzed by potentiometric titration and found to be 0.6 milliequivalent/g. and 0.5 milliequivalent/g., respectively.

In addition to the polyamide precursor sample described above, aliquot samples were also taken mid-way (time basis) of stages 2$a$, 2$b$, and 2$c$ and analyzed for free ammonia content. This analysis showed the ammonia content to be: in stage 2$a$, 1.5%; in stage 2$b$, 0.4%, and in stage 2$c$, 0.1%.

EXAMPLE IA

Example I was repeated except that ammonia was removed from the reaction zone during stage 1 so that the average concentration of ammonia during this stage was 0.5% by weight. The polymer product finally obtained was analyzed and found to have an intrinsic viscosity in m-cresol at 29° C. of 0.9 and was also found to have an unacceptable high content of gel from a fiber-forming point of view.

EXAMPLE II

Example I was repeated except that the hexamethylenediamine and part of the water were added gradually during the first reaction stage according to the following time table:

| Time, hrs. | Hexamethyl-enedi-amine added g. | $H^2O$, g. |
|---|---|---|
| 0 | 58.11 | 91.5 |
| 0.5 | 11.63 | 18.3 |
| 1.0 | 11.62 | 18.3 |
| 2.0 | 11.62 | 18.3 |
| 3.0 | 11.62 | 18.3 |
| 4.0 | 11.62 | 18.3 |

The polymer product obtained was found to be identical with commercial nylon-6,6 and had an intrinsic viscosity of 1.7. Both drawn and undrawn fibers made from this polymer were examined microscopically and found to have extremely low-gel content.

EXAMPLE III

To an electrically-heated glass-lined tubular reactor (I.D.=5 cm. and length=200 cm.) equipped with temperature controller and means for recycling was fed continuously a mixture containing 108.14 parts adiponitrile, 116.22 parts hexamethylenediamine and 220 parts water at a rate of 0.5 liter/hr. The temperature of the reactor was controlled at 230±2° C. and the rate of recycling was adjusted so that 50% of the reaction mixture leaving the reactor was recycled and mixed in with the fresh feed to the reactor and 50% collected as polyamide prescursor product. The flow rate through the reactor tube was accordingly 1 liter/hr. and the residence time was calculated to be approximately 4 hrs.

600 ml. of the so obtained polyamide precursor product were charged to an electrically heated 1-liter glass-lined autoclave, equipped with a stirrer, a temperature controller and a pressure regulator and converted into a tough, hard, white solid polymer product using the same technique and pressure/temperature regimen as described for stages 2$a$ through 3 in Example I. The product had an intrinsic viscosity of 1.7 in m-cresol at 29° C. The polymer was converted into fibers and found to have physical properties identical to those obtained for a polymer sample prepared from hexamethylenediamine and adipic acid. Both drawn and undrawn fibers were examined microscopically and found to have extremely low gel content. The second cycle melting point of the polymer 262±1° C.

EXAMPLES IV-X

Following the general procedure of Example I, but varying the water concentration of the initial solution, the pressures, temperatures, and times of reaction; a series of experiments were carried out and the data for these experiments, together with the properties of the products produced, are set forth in Table II below. As will be seen from experiments VI–VIII, when the pressure, temperature, or time deviates from the ranges characteristic of the process of this invention as described above, an adverse effect upon the quality and nature of the product is observed. Examples IV, V and IX illustrate the importance of the specified limits for the water concentration in systems wherein no NH₃ is charged to the system. Example VI further clearly demonstrates the necessity of using the second stage of reaction in order to maintain a minimum level of ammonia in the system while converting the polyamide precursor into a useful fiber-grade high molecular weight product. The amounts of adiponitrile and hexamethylenediamine in the charge are in every case the same as in Example I. Units: Time, min.; Pressure, p.s.i.g., and Temperature, °C.

TABLE II

| Example | Percent water in charge | Time/temperature/pressure | | | | | Polymer characteristics |
|---|---|---|---|---|---|---|---|
| | | 1st stage | 2a stage | 2b stage | 2c stage | 3rd stage | |
| IV | 60 | 390/220/Auto | 30/220/Red. to 250 | 120/220–280/250 | 30/280/Red. to 0 | 90/280/0 | Unacceptable high gel content from a fiber processing viewpoint. Intrinsic viscosity (I.V.)=1.4. |
| V | 80 | 390/220/Auto | 30/220/Red. to 250 | 120/220–280/250 | 30/280/Red. to 0 | 90/280/0 | Unacceptable high gel content. I.V.=1.8. Broad molecular weight distribution; M.W./Mn, 3.6. |
| VI | 49.5 | 1,200/210/Auto | Not used | Not used | Not used | 180/255–287/0 | Unacceptable high gel content. I.V.=1.1. |
| VII | 45 | 390/220/Auto | 30/220/Red. to 10 | 120/220–280/10 | 30/280/Red. to 0 | 90/280/0 | Molecular weight too low from a fiber processing viewpoint. I.V.=0.8. |
| VIII | 45 | 390/220/Auto | 30/220/Red. to 250 | 120/220–305/250 | 30/305/Red. to 0 | 60/305/0 | Polymer dark in color. |
| IX | 18 | 480/210/1,000 | 30/210/Red. to 200 | 90/210–275/200 | 30/275/Red. to 0 | 120/275/0 | Molecular weight too low from a fiber-processing viewpoint. I.V.=0.9. |
| X | 35 | 300/240/750 | 30/240/Red. to 280 | 100/240–285/280 | 30/285/Red. to 0 | 60/285/0 | Excellent fiber forming polymer I.V.=1.5. Melting point=262° C. |

EXAMPLES XI–XIII

Example IV (Table II) was repeated in the presence of different amounts of added ammonia during the first stage. Table III summarizes the results obtained as function of the average concentration of ammonia during stage 1.

TABLE III

| Example | Percent NH₃ | Polymer characteristics |
|---|---|---|
| IV | *2.7 | Unacceptable high gel content from a fiber processing viewpoint. I.V.=1.4. |
| XI | 3.3 | Unacceptable high gel content from a fiber processing viewpoint. I.V.=1.5. |
| XII | 4.0 | Acceptable gel content from a fiber processing viewpoint. I.V.=1.5. |
| XIII | 5.0 | Excellent fiber forming properties. I.V.=1.6. |

*No ammonia added.

The embodiments of the invention in which an exclusive property is claimed are defined as follows:

1. A process for producing a saturated aliphatic polycarbonamide which comprises the steps of:
   (a) forming an aqueous mixture of a saturated aliphatic diamine and a saturated aliphatic dinitrile in substantially equimolar ratio, the mixture containing 20 to 95% by weight of water based upon the total of diamine, dinitrile and water,
   (b) heating the mixture in a first stage in a substantially closed reaction zone at autogenous or higher pressure up to about 2000 p.s.i.g. and at a temperature of 200 to 260° C., until at least 80% of the dinitrile has reacted, said reaction zone having an average content of ammonia of at least 1% by weight in the liquid phase contained in said zone,
   (c) heating the mixture in a second stage while reducing said pressure to a lower pressure than the pressure prevailing in step (b), but said lower pressure being sufficient to maintain an average content of ammonia in the second stage reaction zone of at least 0.1% by weight in the liquid phase, and being not less than about atmospheric pressure, said heating in the second stage being continued until at least 90% of the dinitrile has reacted, and
   (d) heating the reaction mixture from step (c) at a substantially constant temperature within the range of 260 to 300° C. and at substantially atmospheric pressure or below while venting in order to eliminate residual water and ammonia, said heating in step (d) being sufficient to provide a polyamide having an intrinsic viscosity suitable for fiber formation.

2. A process for producing poly(hexamethyleneadipamide) which comprises the steps of:
   (a) forming an aqueous mixture of hexamethylenediamine and adiponitrile in substantially equimolar ratio, the mixture containing 20 to 95% by weight of water based upon the total of hexamethylenediamine, adiponitrile and water,
   (b) heating the mixture in a first stage in a substantially closed reaction zone at autogenous or higher pressure up to about 2000 p.s.i.g. and at a temperature of 200 to 260° C., until at least 80% of the dinitrile has reacted, said reaction zone having an average content of ammonia of at least 1% by weight in the liquid phase contained in said zone,
   (c) heating the mixture in a second stage while reducing said pressure to a lower pressure than the pressure prevailing in step (b), but said lower pressure being sufficient to maintain an average content of ammonia in the second stage reaction zone of at least 0.1% by weight in the liquid phase, and being not less than about atmospheric pressure, said heating in the second stage being continued until at least 90% of the adiponitrile has reacted, and
   (d) heating the reaction mixture from step (c) at a substantially constant temperature within the range of 260 to 300° C. and at substantially atmospheric pressure or below while venting in order to eliminate residual water and ammonia, said heating in step (d) being sufficient to provide a poly(hexamethyleneadipamide) having an intrinsic viscosity suitable for fiber formation.

3. The process as defined in claim 1, wherein ammonia is added to the aqueous mixture and the ammonia content in step (b) is at least about 3.5% in said mixture.

4. The process as defined in claim 2, wherein ammonia is added to the aqueous mixture and the ammonia content in step (b) is at least about 3.5% in said mixture.

5. A process for producing a saturated aliphatic polycarbonamide which comprises the steps of:
   (a) forming an aqueous mixture of a saturated aliphatic diamine and a saturated aliphatic dinitrile in substantially equimolar ratio, the mixture containing 20 to 95% by weight of water based upon the total of diamine, dinitrile and water,
   (b) heating the mixture in a first stage in a reaction zone at a temperature of 200 to 260° C. until at least 80% of the dinitrile has reacted, said reaction zone having an average content of ammonia of at least 1% by weight in the liquid phase,
   (c) venting the reaction zone to reduce the pressure during the course of this step (c) from the final pressure of step (b) to a lower pressure not less than about atmospheric pressure while raising the temperature of the reaction mixture by at least 10° C. to a temperature of 260° to 300° C., and thereby heating the mixture in a second stage, and while maintaining an average content of ammonia in the second stage reaction zone of at least 0.1% by weight in the liquid phase, said heating in the second stage being continued until at least 90% of the dinitrile has reacted, and (d) heating the reaction mixture from step (c) at a substantially constant temperature in the range of 250° to 300° C. while venting the step (c) reaction zone at a pressure of atmospheric or below to eliminate water and ammonia, said heating in step (d) being sufficient to provide a polyamide having an intrinsic viscosity suitable for fiber formation.

6. A process for producing poly(hexamethyleneadipamide) which comprises the steps of:

(a) forming an aqueous mixture of hexamethylenediamine and adiponitrile in substantially equimolar ratio, the mixture containing 20 to 95% by weight of water based upon the total of hexamethylenediamine, adiponitrile and water, (b) heating the mixture in a first stage in a reaction zone at a temperature of 200° to 260° C. until at least 80% of the adiponitrile has reacted, said reaction zone having an average content of ammonia of at least 1% by weight in the liquid phase, (c) venting the reaction zone to reduce the pressure during the course of this step (c) from the final pressure of step (b) to a lower pressure not less than about atmospheric pressure while raising the temperature of the reaction mixture by at least 10° C. to a temperature of 260° to 300° C., and thereby heating the mixture in a second stage, and while maintaining an average content of ammonia in the second stage reaction zone of at least 0.1% by weight in the liquid phase, said heating in the second stage being continued until at least 90% of the adiponitrile has reacted and (d) heating the reaction mixture from step (c) at a substantially constant temperature in the range of 250° to 300° C. while venting the step (c) reaction zone at a pressure of atmospheric or below to eliminate water and ammonia, said heating in step (d) being sufficient to provide a poly(hexamethyleneadipamide) having an intrinsic viscosity suitable for fiber formation.

7. The process as defined in claim 5, wherein the temperature of the reaction mixture in step (c) is raised to 260° to 300° C. in the course of 10 to 420 minutes and the reaction mixture is heated in step (d) for a period of 10 to 240 minutes.

8. The process as defined in claim 6, wherein the temperature of the reaction mixture in step (c) is raised to 260° to 300° C. in the course of 10 to 420 minutes and the reaction mixture is heated in step (d) for a period of 10 to 240 minutes.

9. The process as defined in claim 1, wherein step (b) is carried out until at least 90% of the dinitrile has reacted and step (c) is carried out until at least 95% of the dinitrile has reacted.

10. The process as defined in claim 2, wherein step (b) is carried out until at least 90% of the adiponitrile has reacted and step (c) is carried out until at least 95% of the adiponitrile has reacted.

11. A process for producing a saturated aliphatic polycarbonamide which comprises the steps of:

(a) forming an aqueous mixture of a saturated aliphatic diamine and a saturated aliphatic dinitrile in substantially equimolar ratio, the solution containing 20 to 95% by weight of water based upon the total of diamine, dinitrile and water.

(b) heating the mixture in a reaction zone at a temperature of 200° to 260° C. until at least 80% of the dinitrile has reacted, (c) venting the reaction zone to reduce the pressure from the final pressure of step (b) to a lower pressure in the range of 50 to 700 p.s.i.g. and continuing to maintain the mixture at a temperature of 200° to 260° C. for a period of 10 to 120 minutes, (d) increasing the temperature of the reaction mixture by at least 10° C. to a temperature of 260° to 300° C. while maintaining the pressure substantially constant for a period of 10 to 180 minutes, (e) maintaining the temperature of the reaction mixture at 260° to 300° C. but decreasing the pressure to a lower pressure not less than about atmospheric pressure in the course of 10 to 120 minutes, and (f) heating the reaction mixture at 260° to 300° C. at a pressure of atmospheric or below while venting to remove ammonia and water for a period of 10 to 240 minutes to produce a polyamide having an intrinsic viscosity suitable for fiber formation.

12. A process for producing poly(hexamethyleneadipamide) which comprises the steps of:

(a) forming an aqueous mixture of hexamethylenediamine and adiponitrile in substantially equimolar ratio, the solution containing 20 to 90% by weight of water based upon the total of hexamethylenediamine, adiponitrile and water, (b) heating the mixture in a reaction zone at a temperature of 200° to 260° C. until at least 80% of the adiponitrile has reacted, (c) venting the reaction zone to reduce the pressure from the final pressure of step (b) to a lower pressure in the range of 50 to 700 p.s.i.g. and continuing to maintain the mixture at a temperature of 200° to 260° C. for a period of 10 to 120 minutes, (d) increasing the temperature of the reaction mixture by at least 10° C. to a temperature of 260° to 300° C. while maintaining the pressure substantially constant for a period of 10 to 180 minutes, (e) maintaining the temperature of the reaction mixture at 260° to 300° C. but decreasing the pressure to a lower pressure not less than about atomspheric pressure in the course of 10 to 120 minutes, and (f) heating the reaction mixture at 260° to 300° C. at a pressure of atmospheric or below while venting to remove ammonia and water for a period of 10 to 240 minutes to produce a poly(hexamethylenedipamide) having an intrinsic viscosity suitable for fiber formation.

13. A process for producing a saturated aliphatic polycarbonamide which comprises the steps of:

(a) forming an aqueous mixture of a saturated aliphatic diamine and a saturated aliphatic dinitrile in substantially equimolar ratio, the solution containing 20 to 95% by weight of water based upon the total of diamine, dinitrile and water, (b) heating the mixture in a reaction zone at a temperature of 200° to 260° C. until at least 80% of the dinitrile has reacted, said reaction zone having an average content of ammonia of at least 1% by weight in the liquid phase, (c) venting the reaction zone to reduce the pressure from the final pressure of step (b) to a lower pressure in the range of 50 to 700 p.s.i.g. and continuing to maintain the mixture at a temperature of 200° to 260° C. for a period of 10 to 120 minutes, (d) increasing the temperature of the reaction mixture by at least 10° C. to a temperature of 260° to 300° C. while maintaining the pressure substantially constant for a period of 10 to 180 minutes, (e) maintaining the temperature of the reaction mixture at 260° to 300° C. but decreasing the pressure to a lower pressure not less than about atmospheric pressure in the course of 10 to 120 minutes, an average content of ammonia in the reaction zone of at least 0.1% by weight in the liquid phase being maintained in steps (c), (d) and (e) and (f) heating the reaction mixture at 260° to 300° C. at a pressure of atmospheric or below while venting to remove ammonia and water for a period of 10 to 240 minutes to produce a polyamide having an intrinsic viscosity suitable for fiber formation.

14. A process for producing poly(hexamethyleneadipamide) which comprises the steps of:

(a) forming an aqueous mixture of hexamethylenediamine and adiponitrile in substantially equimolar ratio, the solution containing 20 to 95% by weight of water based upon the total of hexamethylenediamine, adiponitrile and water, (b) heating the mixture in a reaction zone at a temperature of 200° to 260° C. until at least 80% of the adiponitrile has reacted, said reaction zone having an average content of ammonia of at least 1% by weight in the liquid phase, (c) venting the reaction zone to reduce the pressure from the fiinal pressure of step (b) to a lower pressure in the range of 50 to 700 p.s.i.g. and continuing to maintain the mixture at a temperature of 200° to 260° C. for a period of 10 to 120 minutes, (d) increasing the temperature of the reaction mixture by at least 10° C. to a temperature of 260° to 300° C. while maintaining the pressure substantially constant for a period of 10 to 180 minutes, (e) maintaining the temperature of the reaction mixture at 260° to 300° C. but decreasing the pressure to a lower pressure not less than about atmospheric pressure in the course of 10 to 120 minutes, an average content of ammonia in the reaction zone of at least 0.1% by weight in the liquid phase being maintained in steps (c), (d) and (e) and (f) heating the reaction mixture at 260° to 300° C. at a pressure of atmospheric or below while venting to remove ammonia and water for a period of 10 to 240 minutes to produce a poly(hexamethyleneadipamide) having an intrinsic viscosity suitable for fiber formation.

15. The process as defined in claim 11, wherein the temperature in step (b) is 200° to 250° C., the temperature in step (c) is 220° to 250° C., the temperature in step (d) is increased to 270° to 290° C., the temperature in step (e) is 270° to 290° C., and the temperature in step (f) is 270° to 290° C.

16. The process as defined in claim 11, wherein the reaction time in step (c) is 20 to 60 minutes, the reaction in step (d) is 60 to 120 minutes, the reaction time in step (e) is 20 to 60 minutes, and the reaction time in step (f) is 60 to 180 minutes.

17. The process as defined in claim 12, wherein the temperature in step (b) is 200° to 250° C., the temperature in step (c) is 220° to 250° C., the temperature in step (d) is increased to 270° to 290° C., the temperature in step (e) is 270° to 290° C., and the temperature in step (f) is 270° to 290° C.

18. The process as defined in claim 12, wherein the reaction time in step (c) is 20 to 60 minutes, the reaction time in step (d) is 60 to 120 minutes, the reaction time in step (e) is 20 to 60 minutes, and the reaction time in step (f) is 60 to 180 minutes.

19. The process as defined in claim 13, wherein step (b) is continued until at least 90% of the dinitrile has reacted; wherein the temperature in step (b) is 220° to 250° C., the temperature in step (c) is 220° to 250° C., the temperature in step (d) is increased to 270° to 290° C., the temperature in step (e) is 270° to 290° C., and the temperature in step (f) is 270° to 290° C., wherein the reaction time in step (c) is 20 to 60 minutes, the reaction time in step (d) is 60 to 120 minutes, the reaction time in step (e) is 20 to 60 minutes and the reaction time in step (f) is 60 to 180 minutes; and wherein the pressure in step (d) is 200 to 550 p.s.i.g.

20. The process as defined in claim 14, wherein step (b) is continued until at least 90% of the adiponitrile has reacted; wherein the temperature in step (b) is 220° to 250° C., the temperature in step (c) is 220° to 250° C., the temperature in step (d) is increased to 270° to 290° C., the temperature in step (e) is 270° to 290° C., and the temperature in step (f) is 270° to 290° C.; wherein the reaction time in step (c) is 20 to 60 minutes, the reaction time in step (d) is 60 to 120 minutes, the reaction time in step (e) is 20 to 60 minutes, and the reaction time in step (f) is 60 to 180 minutes; and wherein the pressure in step (d) is 200 to 550 p.s.i.g.

21. The process as defined in claim 1, wherein step (b) is carried out continuously with recycling of 10 to 90% of the reaction effluent.

22. The process as defined in claim 2, wherein step (b) is carried out continuously with recycling of 10 to 90% of the reaction effluent.

23. The process as defined in claim 1, wherein at least part of the diamine is gradually added as an aqueous solution to the dinitrile in step (b).

24. The process as defined in claim 2, wherein at least part of the diamine is gradually added as an aqueous soan aqueous solution to the adiponitrile in step (b).

25. The process as defined in claim 1, wherein 5 to 0.1 mol percent of a monofunctional organic acid or a monofunctional organic base is added to the reaction mixture.

26. The process as defined in claim 2, wherein 5 to 0.1 mol percent of a monofunctional organic acid or a monofunctional organic base is added to the reaction mixture.

27. The process as defined in claim 1, wherein at least part of the diamine is gradually added as an aqueous solution to the dinitrile in step (b) and 5 to 0.1 mol percent of a monofunctional organic acid or monofunctional organic base is added to the reaction mixture and step (b) is continued until at least 90% of the dinitrile has reacted.

28. The process as defined in claim 2, wherein at least part of the hexamethylenediamine is gradually added as an aqueous solution to the adiponitrile in step (b) and 5 to 0.1 mol percent of a monofunctional organic acid or monofunctional organic base is added to the reaction mixture and step (b) is continued until at least 90% of the adiponitrile has reacted.

29. The process as defined in claim 1, wherein the aqueous mixture of step (a) contains 20 to 50% by weight of water.

30. The process as defined in claim 2, wherein the aqueous mixture of step (a) contains 20 to 50% by weight of water.

31. The process as defined in claim 1, wherein the aqueous mixture of step (a) contains 50 to 95% by weight of water and ammonia is added to the aqueous mixture whereby the reaction zone in step (b) has an average content of ammonia of at least 3.5% in said mixture.

32. The process as defined in claim 2, wherein the aqueous mixture of step (a) contains 50 to 95% by weight of water and ammonia is added to the aqueous mixture whereby the reaction zone in step (b) has an average content of ammonia of at least 3.5% in said mixture.

References Cited
UNITED STATES PATENTS

| | | | |
|---|---|---|---|
| 2,245,129 | 6/1941 | Greenwalt | 260—78 R |
| 2,130,948 | 9/1938 | Carothers | 260—78 R |
| 3,692,750 | 9/1972 | Duling et al. | 260—78 R |

HAROLD D. ANDERSON, Primary Examiner